(12) United States Patent
Lee et al.

(10) Patent No.: US 8,787,424 B2
(45) Date of Patent: Jul. 22, 2014

(54) CIRCUIT FOR SPREAD SPECTRUM TRANSMISSION AND METHOD THEREOF

(71) Applicant: National Taiwan University, Taipei (TW)

(72) Inventors: Tai-Cheng Lee, Taipei (TW); Chien-Heng Wong, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/927,920

(22) Filed: Jun. 26, 2013

(65) Prior Publication Data

US 2014/0146933 A1 May 29, 2014

(30) Foreign Application Priority Data

Nov. 29, 2012 (TW) .............................. 101144645 A

(51) Int. Cl.
*H04B 1/00* (2006.01)
*H04L 7/033* (2006.01)

(52) U.S. Cl.
CPC .................................. *H04L 7/0331* (2013.01)
USPC ........... 375/146; 375/135; 375/373; 375/376; 327/147; 327/156

(58) Field of Classification Search
USPC .......... 375/135, 146, 371–376; 327/146–150, 327/155–159
See application file for complete search history.

(56) References Cited

U.S. PATENT DOCUMENTS

2009/0135885 A1* 5/2009 Lin ............................... 375/130
2009/0167428 A1* 7/2009 Jong et al. ..................... 329/319

\* cited by examiner

*Primary Examiner* — Curtis Odom
(74) *Attorney, Agent, or Firm* — Tim Tingkang Xia, Esq.; Morris, Manning & Martin, LLP

(57) ABSTRACT

A spread spectrum transmission circuit includes a phase locked loop composed of a filter. The phase locked loop generates a series of incremental control signals and decreasing control signals based on the frequency difference and phase difference between a reference clock signal and a feedback signal. The circuit further has a frequency locked loop an amplitude locked loop, a digital-analog converter, an injection current source, an extraction current source, a multiplexer is connected to the locked phase loop and a rail-to-rail digital signal generator having an input connected to the multiplexer and an output connected to inputs of the locked frequency loop and the locked amplitude loop.

6 Claims, 6 Drawing Sheets

CIRCUIT FOR SPREAD SPECTRUM TRANSMISSION AND METHOD THEREOF

CROSS-REFERENCE TO RELATED APPLICATION

This application claims priority from application No. 101144645, filed on Nov. 29, 2012 in the Taiwan Intellectual Property Office.

FIELD OF THE INVENTION

The invention relates to a circuit for spread spectrum transmission and method thereof, more particularly, to a circuit and method for generating spread spectrum clock using self-resonance.

BACKGROUND OF THE INVENTION

As the advance of Metal-Oxide-Semiconductor Field-Effect Transistor, MOSFET, more and more applications are implemented on a single chip. Because the frequency of transmission signal is higher following different generations, avoiding electromagnetic interference (EMI) to the transmission signal has become an issue for the industry. One approach to avoid the EMI to the transmission signal is by blocking the EMI from every possible aspect. However, the cost of using this blocking technology is high and therefore, it is often not the first choice for the industry. Another approach to prevent EMI to the signal is called spread spectrum clock, which is able to be integrated into the circuit and thus widely accepted.

Spread spectrum clock itself is a frequency modulated signal such that it is able to distribute the energy on the carrier wave to a specific band to accomplish the purpose of reducing the electromagnetic interference to the signal so transmitted. Many applications have been developed and implemented, which includes direct modulation to voltage-controlled oscillator, VCO, modulation to Delta-sigma integrator and direct generation of spread spectrum clock using open loop. All the methods mentioned above are implemented by adding modulated signal to generate spread spectrum clock. However, using Delta-sigma modulator to achieve frequency synthesis increases noises in the device, it also consumes more power. None of the above can avoid complex design, large power consumption and large area so required for the purpose.

In order to solve the problem(s), the present invention introduces a circuit which is able to reduce noise in the device and can be implemented in a small area.

SUMMARY OF THE INVENTION

The primary objective of the present invention is to provide a circuit for spread spectrum transmission, which includes:

a phase locked loop, which is composed of a filter and the filter is a capacitor; the phase locked loop generates a series of incremental control signals and decreasing control signals based on the frequency difference and phase difference between a reference clock signal and a feedback signal, charges and discharge the incremental control signals and the decreasing control signals to generate a control voltage and generate a clock signal based on the variations of the control voltage;

a frequency locked loop to receive the reference clock signal and output frequency locked output signal and a ready signal;

an amplitude locked loop connected to outputs of the frequency locked loop and the phase locked loop and receiving the ready signal to activate the amplitude locked loop and receiving the reference clock signal and the clock signal, the amplitude locked loop includes a locked amplitude loop control voltage to output an amplitude locked output signal;

a digital-analog converter connected to the frequency locked loop to receive the frequency locked output signal;

an injection current source to modulate an amplitude of the locked amplitude loop control voltage and output an injection current;

an extraction current source to adjust the amplitude of the locked amplitude loop control voltage of the locked amplitude loop and output an extraction current;

a multiplexer connected to the locked phase loop, the locked amplitude loop, the digital-analog converter, the injection current source and the extraction current source and to receive the control voltage, the control current, the locked amplitude output signal, the injection current and the extraction current, wherein the control voltage is outputted to the locked phase loop; and a rail-to-rail digital signal generator having an input connected to the multiplexer and an output connected to inputs of the locked frequency loop and the locked amplitude loop, wherein the rail-to-rail digital signal generator converts the small signal of the control voltage to rail-to-rail digital signal and transmits the converted control voltage to the locked frequency loop and the locked amplitude loop to allow the locked frequency loop to estimate frequency of the control voltage.

Still another objective of the present invention is to provide a spread spectrum transmission method with simple design and implemented in small area to reduce noises in the device.

The spread spectrum transmission method for use in a spread spectrum transmission circuit having a frequency locked loop, a phase locked loop and a amplitude locked loop, wherein the phase locked loop includes a filter and the filter is a capacitor, the method includes the steps of:

detecting whether the frequency of the frequency locked loop is locked;

detecting whether the amplitude of the amplitude locked loop is locked; and detecting whether the frequency of the frequency locked loop is locked.

With the method just described, effectively decreasing power consumption is readily accomplished without any additional technology to reduce output noise. In addition, due to simple design, the overall complexity is lowered.

DETAILED DESCRIPTION OF THE INVENTION

The following description is merely exemplary in nature and is in no way intended to limit the present teachings, applications, or uses. Those of skill in the art will recognize that the following description is merely illustrative of the principles of the invention, which may be applied in various ways to provide many different alternative embodiments.

Figure 1:
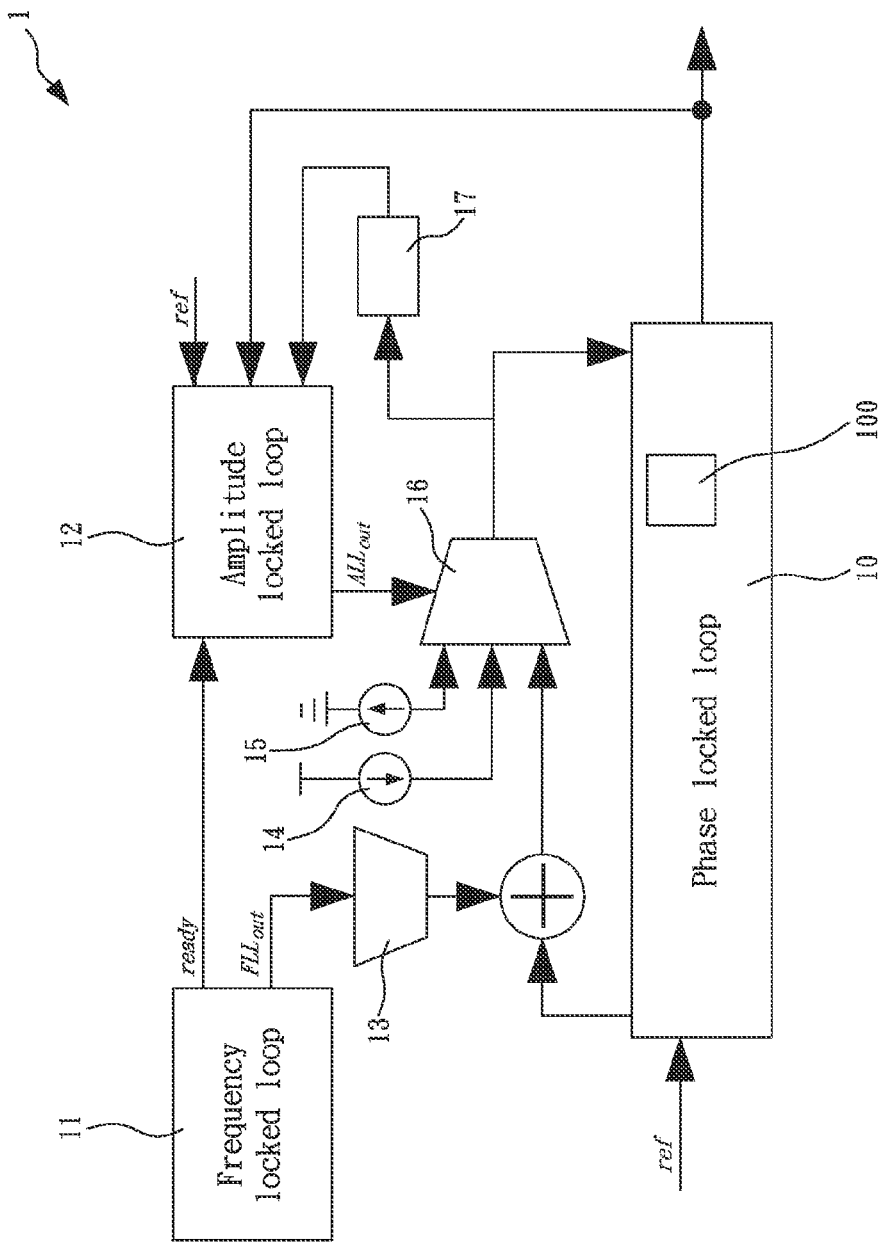
FIG. 1 is an electrical diagram used in the spread spectrum transmission of the preferred embodiment of the present invention.

With reference to FIG. 1, a circuit constructed in accordance with the present invention includes:

a phase locked loop 10, which is composed of a filter 100 and the filter is a capacitor; the phase locked loop 10 generates a series of incremental control signals and decreasing control signals based on comparison and frequency difference and phase difference between a reference clock signal (ref) and a feedback signal, charges and discharges the incremental control signals and the decreasing control signals to generate a control voltage ($V_{ctrl}$) and generate a clock signal based on the variations of the control voltage ($V_{ctrl}$);

a frequency locked loop 11 to receive the reference clock signal (ref) and output frequency locked output signal ($FLL_{out}$) and a ready signal (ready);

an amplitude locked loop 12 connected to outputs of the frequency locked loop 11 and the phase locked loop 10 and receiving the ready signal (ready) to activate the amplitude locked loop and receiving the reference clock signal (ref) and the clock signal, the amplitude locked loop includes a locked amplitude loop control voltage to output an amplitude locked output signal ($ALL_{out}$);

a digital-analog converter 13 connected to the frequency locked loop 11 to receive the frequency locked output signal ($FLL_{out}$);

an injection current source 14 to modulate an amplitude of the locked amplitude loop control voltage of the amplitude locked loop 12 and input an injection current;

an extraction current source 15 to adjust the amplitude of the locked amplitude loop control voltage of the locked amplitude loop and output an extraction current;

a multiplexer 16 connected to the locked phase loop 10, the locked amplitude loop 12, the digital-analog converter 13, the injection current source 14 and the extraction current source 15 and to receive the control voltage ($V_{ctrl}$), the control current, the locked amplitude output signal ($ALL_{out}$), the injection current and the extraction current, wherein the control voltage ($V_{ctrl}$) is outputted to the locked phase loop 10; and a rail-to-rail digital signal generator 17 having an input connected to the multiplexer 16 and an output connected to inputs of the locked frequency loop 11 and the locked amplitude loop 12, wherein the rail-to-rail digital signal generator converts the small signal of the control voltage ($V_{ctrl}$) to rail-to-rail digital signal and transmits the converted control voltage to the locked frequency loop 11 and the locked amplitude loop 12 to allow the locked frequency loop 11 to estimate frequency of the control voltage ($V_{ctrl}$).

Figure 2:
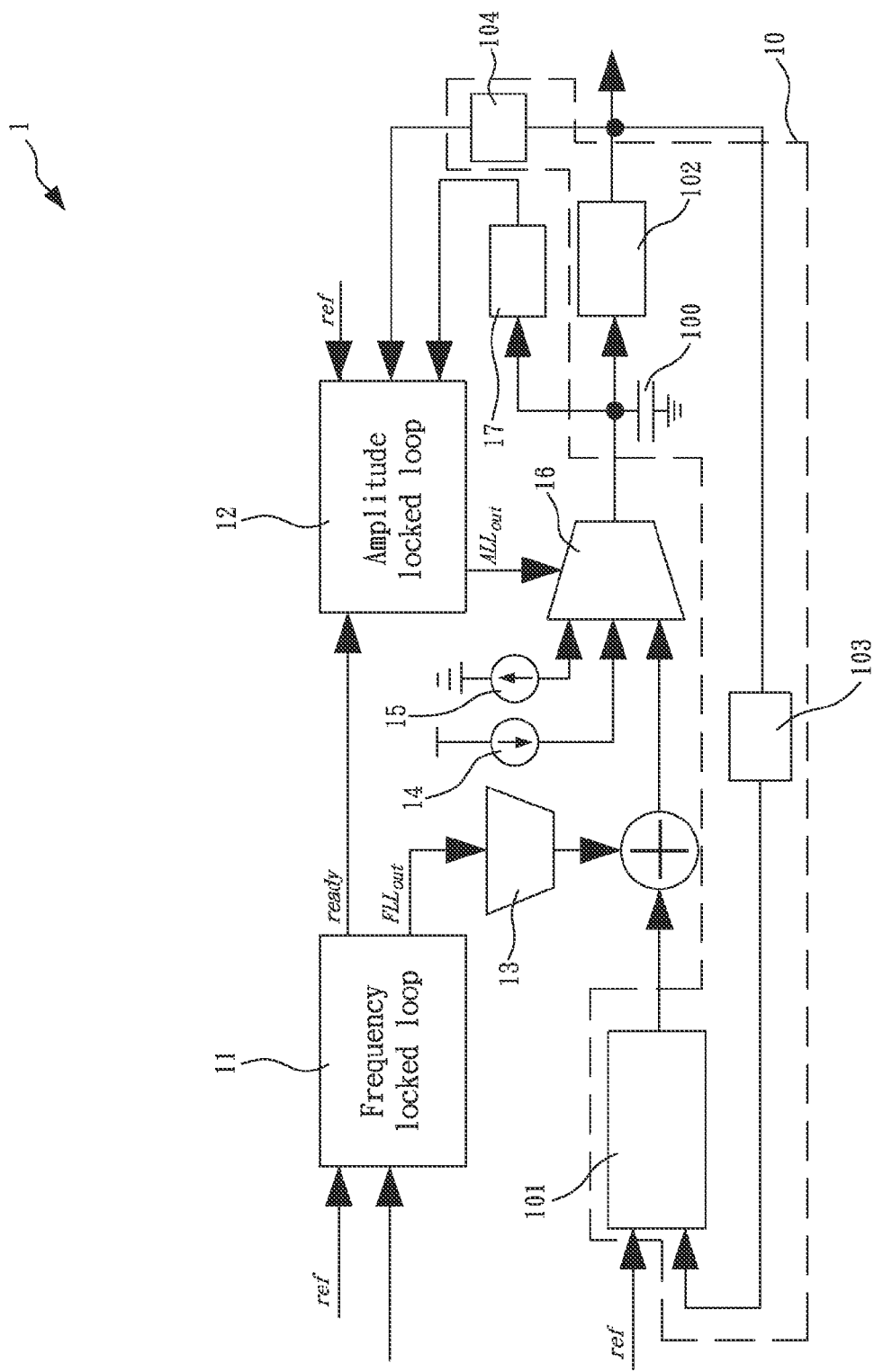
FIG. 2 is a detailed diagram of the electrical circuit of the spread spectrum transmission of the present invention.

With reference to FIG. 2, the phase locked loop further includes:

a phase frequency detector 101,

The phase frequency detector 101 is connected to the multiplexer 16 and receiving the reference clock signal (ref) and the feedback signal to proceed comparison between frequency and phase. The phase frequency detector 101 generates a series of incremental control signal and decreasing control signal based on the differences of frequency and phase of the reference clock signal and the feedback signal and charges and discharges the incremental control signal and the decreasing control signal to generate a control current and finally outputs the control current to the multiplexer 16.

a voltage controlled electronic oscillator 102;

The voltage controlled electronic oscillator 102 is connected to the multiplexer 16 and the filter 100 and to generate the clock signal based on voltage variation of the control voltage ($V_{ctrl}$) of the filter 100.

a first divider 103;

The first divider 103 is connected to the voltage controlled electronic oscillator 102 and to generate the feedback signal in accordance with the clock signal of the voltage controlled electronic oscillator 102.

a second divider 104;

The second divider 104 is connected to the output of the voltage controlled electronic oscillator 102 and to the input of the amplitude locked loop 12. Also, the second divider 104 proceeds with a frequency equalization process to the clock signal of the voltage controlled electronic oscillator 102. After the clock signal is de-frequency, the clock signal is sent to the amplitude locked loop 12.

Figure 3:
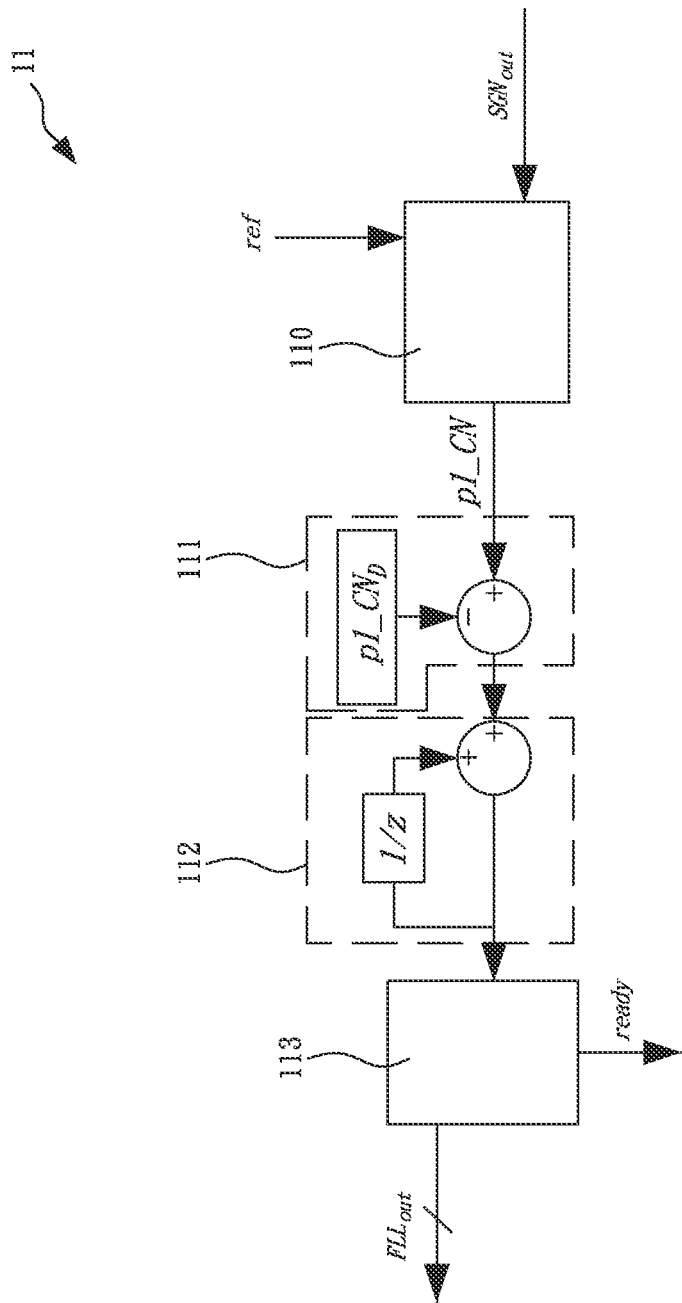
FIG. 3 is an electrical diagram of the frequency locked loop of the preferred embodiment of the present invention.

With reference to FIG. 3, the frequency locked loop 11 includes:

a first edge triggered counter 110;

The first edge triggered counter 110 is to receive the reference clock signal (ref) and the control voltage of the converted rail-to-rail digital signal. When the first edge triggered counter 110 detects the "falling edge" of the control voltage of the rail-to-rail digital signal, the first edge triggered counter 110 starts counting based on the reference clock signal (ref). When the next falling edge of the control voltage of the rail-to-rail digital signal is detected, the first edge triggered counter 110 updates and generates a new value of the reference clock signal (pl_CN).

a first subtractor 111;

The first subtractor 111 is connected to the first edge triggered counter 110 and to receive the value of the reference clock signal (pl_CN) as well as subtracts a specific frequency locked value (pl_CN$_D$).

a first accumulator unit 112;

The first accumulator 112 is connected to the first subtractor 111 and to receive the result of the subtraction by the first subtractor 111. The first accumulator 112 accumulates the subtraction result by the first subtractor 111 by 1/z to generate the frequency locked output signal ($FLL_{out}$).

a cushion and judgment circuit 113;

The cushion and judgment circuit 113 is connected to the first accumulator unit 112, the amplitude locked loop 121 and the digital-analog converter 13 and to receive the frequency locked output signal ($FLL_{out}$) which will then be sent to the digital-analog converter 13 by the cushion and judgment circuit 113. When the frequency of the control voltage ($V_{ctrl}$) is locked, the ready signal is output to the amplitude locked loop 12.

Figure 4:
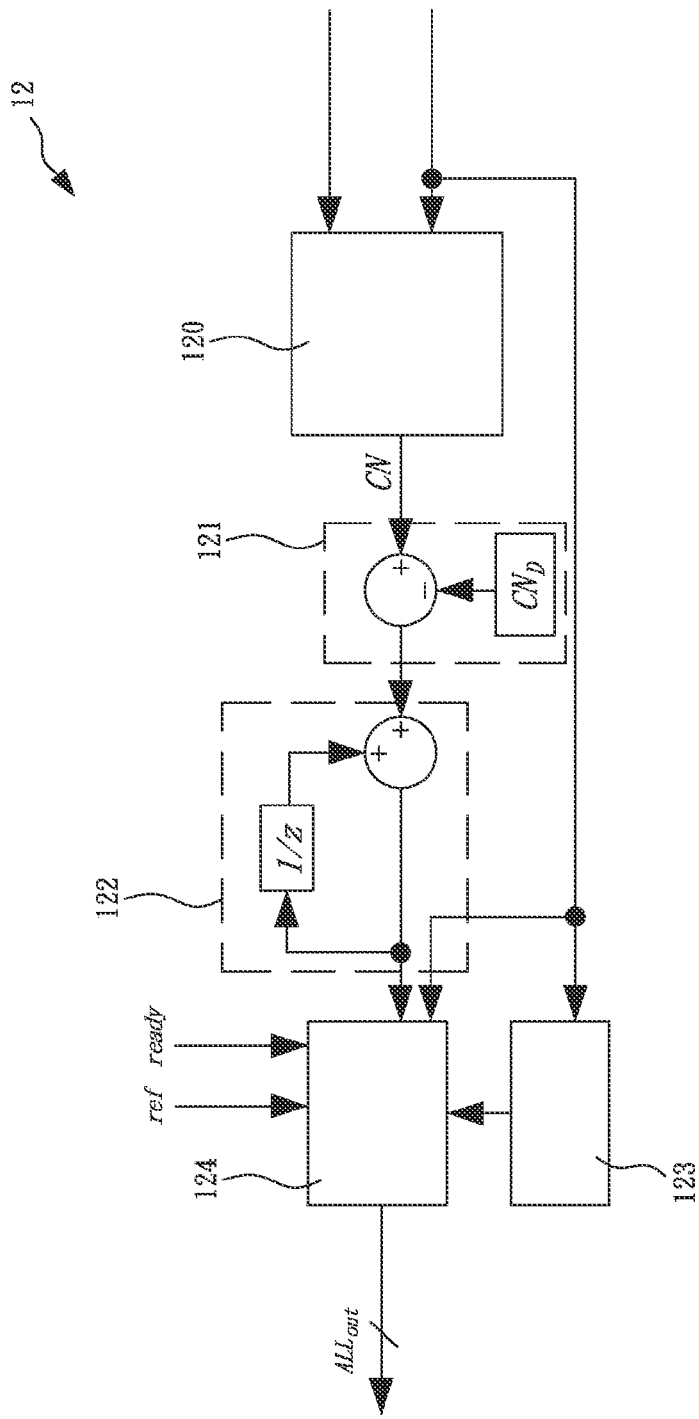
FIG. 4 is an electrical diagram of the amplitude locked loop of the preferred embodiment of the present invention.
Figure 5:
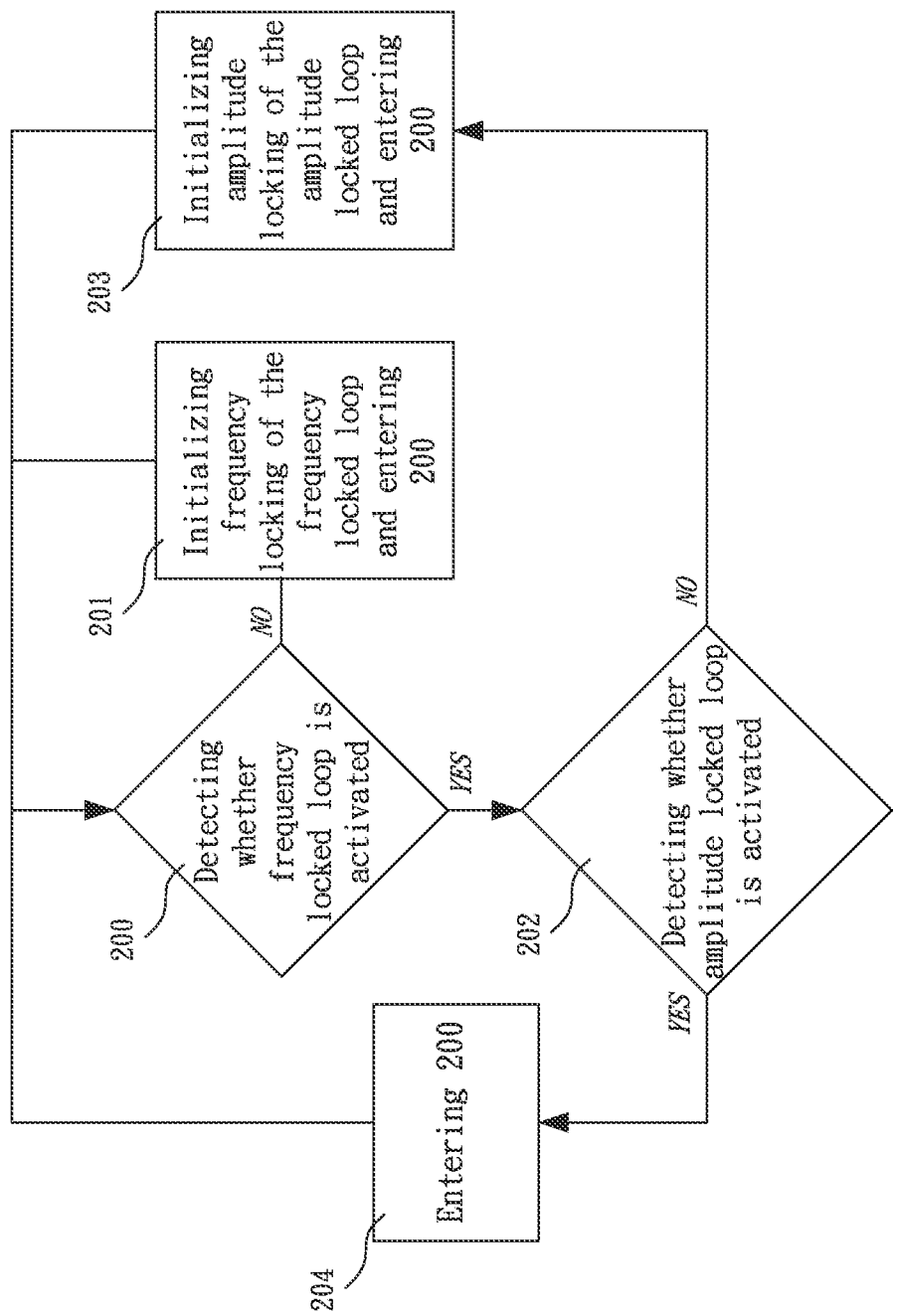
FIG. 5 is a flowchart of the spread spectrum transmission of the preferred embodiment of the present invention.

With reference to FIG. 4, the amplitude locked loop includes:

a second edge triggered counter 120;

The second edge triggered counter 120 is to receive the control voltage of the converted rail-to-rail digital signal and the clock signal after being de-frequency. When the second edge triggered counter 120 detects the falling edge of the control voltage of the converted rail-to-rail digital signal, the second edge triggered counter 120 starts counting to the de-frequency clock signal. After half cycle of the control voltage of the rail-to-rail digital signal passes, the second edge triggered counter 120 stops counting to the de-frequency clock signal and generates a clock signal counting number (CN).

a second subtractor unit 120;

The second subtractor unit 120 is connected to the second edge triggered counter 120 and to receive the clock signal counting number (CN) which in turn, a specific amplitude locked value ($CN_D$) is subtracted.

a second accumulator unit 122;

The second accumulator unit 122 is connected to the second subtractor 120 and to receive the accumulated result of the second subtractor unit 120. The second accumulator 122 accumulates the subtraction result by the second subtractor 121 by 1/z to generate the amplitude locked output signal ($ALL_{out}$).

a compensation counter 123;

The compensation counter 123 is connected to the rail-to-rail digital signal generator 17 and to receive the control voltage of the converted rail-to-rail digital signal. When the work cycle of the control voltage of the rail-to-rail digital signal is not equal to 50%, the compensation counter 123 outputs a compensated value.

a positioning counter 124;

The positioning counter 124 is connected to the second accumulator unit 122, the rail-to-rail digital signal generator 17, the compensation counter 123, the frequency locked loop 11 and the multiplexer 16 and to receive the amplitude locked signal ($ALL_{out}$), the converted the control voltage of the rail-to-rail digital signal, the referenced clock signal (ref), the ready signal and the compensated value. The positioning counter 124 starts counting to ¼ wavelength of the control voltage of the converted rail-to-rail digital signal so as to convert to the control voltage of the rail-to-rail digital signal at the largest value and output the amplitude locked output signal ($ALL_{out}$) to the multiplexer 16, in which the output of the multiplexer 16 is connected to the filter 100.

With reference to FIGS. 1 to 5, the spread spectrum transmission method 2 of the present invention is implemented to a spread spectrum transmission circuit 1 having a phase locked loop 10, a frequency locked loop 11 and an amplitude locked loop 12. The phase locked loop 10 further includes a filter 100, a capacitor. The spread spectrum transmission method of the present invention includes the steps of:

200: detecting if the frequency of the frequency locked loop 11 is locked;

201: if the frequency of the frequency locked loop 11 is not locked, the frequency locked loop 11 proceeds frequency locking process and then goes to step 200 again;

202: if the frequency of the frequency locked loop 11 is locked, detecting if the amplitude of the amplitude locked loop 12 is locked;

203: if the amplitude of the amplitude locked loop 12 is not locked, the amplitude locked loop 12 proceeding amplitude locking process and then going to step 200; and 204: if the amplitude of the amplitude locked loop 12 is locked, entering step 200.

Figure 6A:
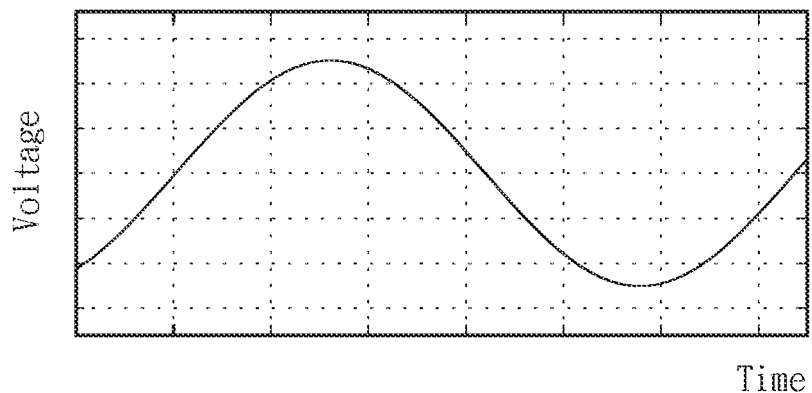
FIG. 6A is a chart showing the relationship between the control voltage and time of the self-oscillated method of the present invention.
Figure 6B:
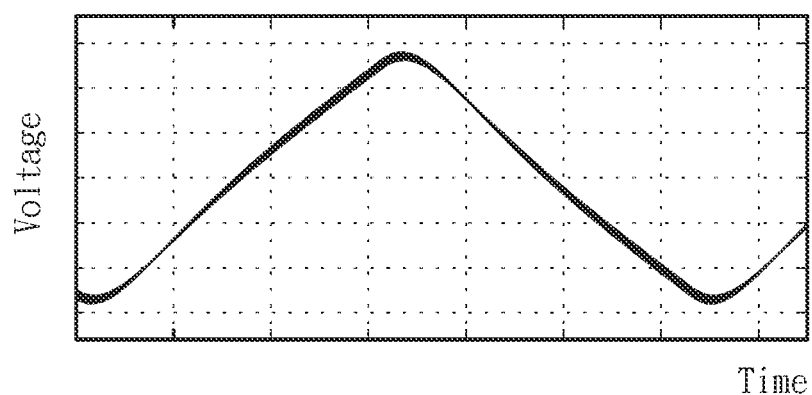
FIG. 6B is a chart showing the relationship between the control voltage and time of the conventional sigma-delta modulator.

With reference to FIGS. 6A and 6B, it is noticeable that the lines shown in FIG. 6A is much smoother that those shown in FIG. 6B. It is then an evidence showing that noises in the spread spectrum transmission using self-oscillation concept is much lower than that occurred in the spread spectrum transmission using sigma-delta modulator.

From the description above, it is noted that the method used in the preferred embodiment of the present invention is using the self-oscillation concept to generate clock of the spread spectrum without additional technique to lower the noises. As a result, the method of the present invention effectively reduces power consumption and design complexity due to simple framework.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. A spread spectrum transmission circuit comprising:
a phase locked loop, which is composed of a filter and the filter is a capacitor, wherein the phase locked loop generates a series of incremental control signals and decreasing control signals based on the frequency difference and phase difference between a reference clock signal and a feedback signal, charges and discharge the incremental control signals and the decreasing control signals to generate a control voltage and generate a clock signal based on variations of the control voltage;
a frequency locked loop to receive the reference clock signal and output frequency locked output signal and a ready signal;
an amplitude locked loop connected to outputs of the frequency locked loop and the phase locked loop and receiving the ready signal to activate the amplitude locked loop and receiving the reference clock signal and the clock signal, the amplitude locked loop includes a locked amplitude loop control voltage to output an amplitude locked output signal;
a digital-analog converter connected to the frequency locked loop to receive the frequency locked output signal;
an injection current source to modulate amplitude of the locked amplitude loop control voltage and output an injection current;
an extraction current source to adjust the amplitude of the locked amplitude loop control voltage of the locked amplitude loop and output an extraction current;
a multiplexer connected to the locked phase loop, the locked amplitude loop, the digital-analog converter, the injection current source and the extraction current source and to receive the control voltage, the control current, the locked amplitude output signal, the injection current and the extraction current, wherein the control voltage is outputted to the locked phase loop; and
a rail-to-rail digital signal generator having an input connected to the multiplexer and an output connected to inputs of the locked frequency loop and the locked amplitude loop, wherein the rail-to-rail digital signal generator converts the small signal of the control voltage to rail-to-rail digital signal and transmits the converted control voltage to the locked frequency loop and the locked amplitude loop to allow the locked frequency loop to estimate frequency of the control voltage.

2. The circuit as claimed in claim 1, wherein the phase locked loop further has:
a phase frequency detector,
wherein the phase frequency detector is connected to the multiplexer and receives the reference clock signal (ref) and the feedback signal to proceed comparison between frequency and phase,
generates a series of incremental control signal and decreasing control signal based on differences of frequency and phase of the reference clock signal and the feedback signal and charges and discharges the incremental control signal and the decreasing control signal to generate a control current and outputs the control current to the multiplexer;

a voltage controlled electronic oscillator, wherein the voltage controlled electronic oscillator is connected to the multiplexer and the filter, generates the clock signal based on voltage variation of the control voltage of the filter;

a first divider, wherein the first divider is connected to the voltage controlled electronic oscillator and to generate the feedback signal in accordance with the clock signal of the voltage controlled electronic oscillator; and a second divider, wherein the second divider is connected to output of the voltage controlled electronic oscillator and to input of the amplitude locked loop, proceeds with a frequency equalization process to the clock signal of the voltage controlled electronic oscillator, and sends the equalized clock signal to the amplitude locked loop.

3. The circuit as claimed in claim 1, wherein the frequency locked loop has:

a first edge triggered counter, wherein the first edge triggered counter is to receive the reference clock signal and the control voltage of the converted rail-to-rail digital signal, the first edge triggered counter starts counting based on the reference clock signal when the first edge triggered counter detects falling edge of the control voltage of the rail-to-rail digital signal, the first edge triggered counter updates and generates a new value of the reference clock signal when next falling edge of the control voltage of the rail-to-rail digital signal is detected;

a first subtractor, wherein the first subtractor is connected to the first edge triggered counter and to receive the value of the reference clock signal as well as subtracts a specific frequency locked value;

a first accumulator unit, wherein the first accumulator is connected to the first subtractor and to receive the result of the subtraction by the first subtractor, the first accumulator accumulates the subtraction result by the first subtractor by 1/z to generate the frequency locked output signal; and a cushion and judgment circuit, wherein the cushion and judgment circuit is connected to the first accumulator unit, the amplitude locked loop and the digital-analog converter and to receive the frequency locked output signal which will then be sent to the digital-analog converter by the cushion and judgment circuit, the ready signal is output to the amplitude locked loop when the frequency of the control voltage is locked.

4. The circuit as claimed in claim 2, wherein the frequency locked loop has:

a second edge triggered counter, wherein the second edge triggered counter is to receive the control voltage of the converted rail-to-rail digital signal and the clock signal after being de-frequency, the second edge triggered counter starts counting to the de-frequency clock signal when the second edge triggered counter detects the falling edge of the control voltage of the converted rail-to-rail digital signal, and after half cycle of the control voltage of the rail-to-rail digital signal passes, the second edge triggered counter stops counting to the de-frequency clock signal and generates a clock signal counting number;

a second subtractor unit, wherein the second subtractor unit is connected to the second edge triggered counter and to receive the clock signal counting number and subtract a specific amplitude locked value to the clock signal;

a second accumulator unit, the second accumulator unit is connected to the second subtractor and to receive the accumulated result of the second subtractor unit, the second accumulator accumulates the subtraction result by the second subtractor by 1/z to generate the amplitude locked output signal;

a compensation counter, the compensation counter is connected to the rail-to-rail digital signal generator and to receive the control voltage of the converted rail-to-rail digital signal, the compensation counter outputs a compensated value when the work cycle of the control voltage of the rail-to-rail digital signal is not equal to 50%; and a positioning counter, wherein the positioning counter is connected to the second accumulator unit, the rail-to-rail digital signal generator, the compensation counter, the frequency locked loop and the multiplexer and to receive the amplitude locked signal, the converted the control voltage of the rail-to-rail digital signal, the referenced clock signal, the ready signal and the compensated value, the positioning counter starts counting to ¼ wavelength of the control voltage of the converted rail-to-rail digital signal so as to convert to the control voltage of the rail-to-rail digital signal at the largest value and output the amplitude locked output signal to the multiplexer.

5. The circuit as claimed in claim 1, wherein the filter is connected to the multiplexer.

6. A spread spectrum transmission method for use in a spread spectrum circuit composed of a phase locked loop, a frequency locked loop and an amplitude locked loop, the phase locked loop having a filter and the filter being a capacitor, the method comprising the steps of:

detecting if frequency of the frequency locked loop is locked;

if the frequency of the frequency locked loop is not locked, the frequency locked loop proceeds with a frequency lock step and reenter detecting if the frequency of the frequency locked loop is locked;

detecting if amplitude of the amplitude locked loop is locked if the frequency of the frequency locked loop is locked;

if the amplitude of the amplitude locked loop is not locked, the amplitude locked loop proceeds with an amplitude lock step and reenter detecting if the amplitude of the amplitude locked loop is locked; and detecting if the frequency of the frequency locked loop is locked if the amplitude of the amplitude locked loop is locked.

* * * * *